United States Patent [19]

Hausslein

[11] Patent Number: 4,981,496

[45] Date of Patent: Jan. 1, 1991

[54] CHARCOAL BRIQUET AND IGNITION MEANS

[75] Inventor: Robert W. Hausslein, Lexington, Mass.

[73] Assignee: Opalite Corporation, Lexington, Mass.

[21] Appl. No.: 367,774

[22] Filed: Jun. 19, 1989

[51] Int. Cl.$^5$ .................... C10L 5/36; C10L 11/06
[52] U.S. Cl. ................................ 44/531; 44/532; 44/541
[58] Field of Search ............... 44/14, 531, 532, 541

[56] References Cited

U.S. PATENT DOCUMENTS

| 308,140 | 11/1884 | Connelly | 44/14 |
|---|---|---|---|
| 748,312 | 12/1903 | Sachse | 44/14 |
| 1,866,931 | 7/1932 | Heffernan | 44/14 |
| 1,959,472 | 5/1934 | Heffernan | 44/14 |
| 2,933,378 | 4/1960 | Mustin | 44/14 |
| 3,367,757 | 2/1968 | Church | 44/38 |
| 4,243,393 | 1/1981 | Christian | 44/14 |
| 4,485,584 | 12/1984 | Raulerson | 44/66 |

FOREIGN PATENT DOCUMENTS

| 7261 | of 1884 | United Kingdom | 44/14 |
|---|---|---|---|
| 10371 | of 1887 | United Kingdom | 44/14 |
| 13299 | of 1895 | United Kingdom | 44/14 |
| 4606 | of 1902 | United Kingdom | 44/531 |
| 202412 | 9/1923 | United Kingdom | 44/14 |

Primary Examiner—Carl F. Dees
Attorney, Agent, or Firm—Hamilton, Brook, Smith & Reynolds

[57] ABSTRACT

A novel charcoal briquet and ignition means is disclosed. The combustible briquet of the present invention comprises a central mass and at least one easily ignited, thin member extending outwardly from the mass such that upon igniting the thin member, propagation of an ignited region proceeds rapidly to the mass. Also disclosed is a holding member for a combustible briquet having at least one configuration incised in the surface to provide a holding force sufficient to retain the briquet.

29 Claims, 4 Drawing Sheets

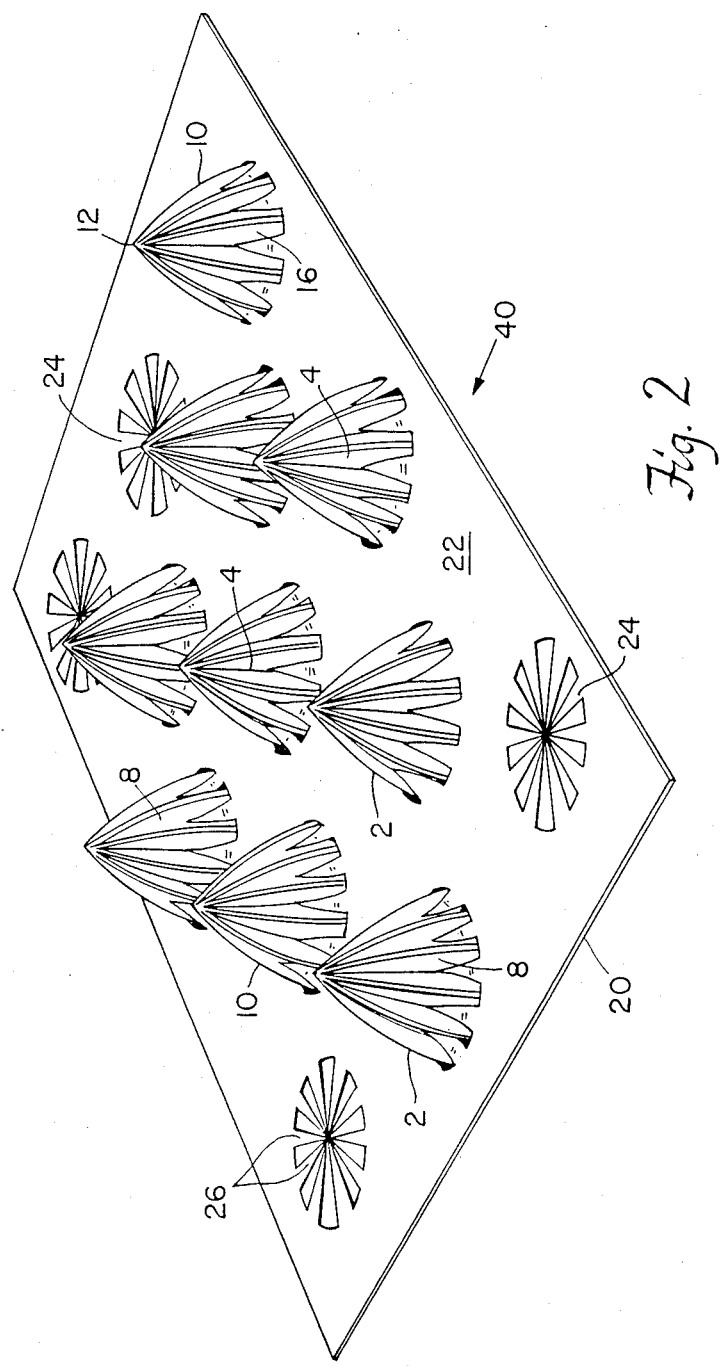

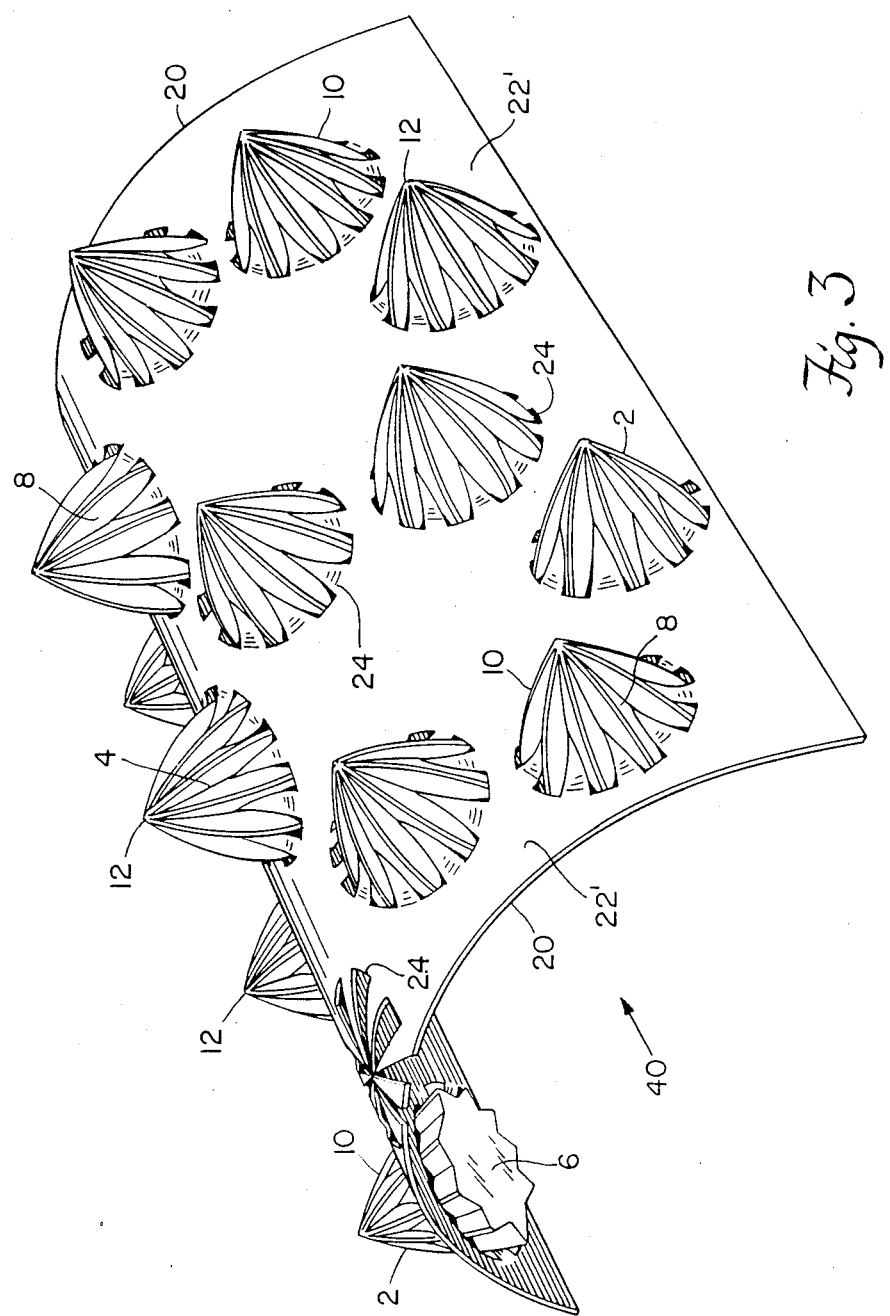

CHARCOAL BRIQUET AND IGNITION MEANS

FIELD OF THE INVENTION

The present invention relates to combustible briquets in general and more particularly to charcoal briquets of the type used for cooking with charcoal grills.

BACKGROUND OF THE INVENTION

Conventional charcoal briquets are typically pillow-shaped and are generally ignited with the aid of a flammable fluid. The burning fluid slowly raises the surface temperature of a mass of briquets until actual combustion of the charcoal begins. Usually, the flame from the burning fluid is dying out as multiple glowing regions of combustion overlaid with white-gray ash are forming on the briquets. The regions of combustion proceed to spread slowly over the surface of the briquets. In general, the mass of briquets is considered ready for cooking when greater than 80% of the surface area of the briquets is "ashed over". The process of igniting a sufficient amount of the conventional briquets to allow for proper cooking is a time-consuming process. For example, one must wait approximately one-half hour prior to cooking for sufficient heat to be emitted from the charcoal briquets.

Currently available are holders for the conventional briquets which resemble egg cartons. These "egg cartons" are typically impregnated with a readily combustible substance such as wax to aid in the ignition process. The production of these holders is a costly operation wherein the egg carton is formed in a press from a paper-mache consistency and subsequently is allowed to dry.

A solid fuel unit for charcoal cooking is described by Mustin et al. in U.S. Pat. No. 2,933,378. It comprises a solid mat of carbon fuel material having a number of protuberances arranged in groups, and a combustible outer covering. This fuel unit also must be formed through a press and thus, has the same disadvantage as the "egg-carton" described above.

Other charcoal briquets having grooves, protrusions or pockets for use in incense burners to retain incense have been described by Hefferman in U.S. Pat. No. 1,866,931 and U.S. Pat. No. 1,959,472. Further, Christian describes in U.S. Pat. No. 4,243,393 a coal article defined by a hollow core which may contain igniter material and may also be characterized by ribs, flutes or the like in the inner or outer walls of the tube-like article.

Furthermore, both loose briquets and the charcoal briquets described above are generally not packaged for ease of transport or for stacking in a grill and they leave a sooty residue when handled by the user.

SUMMARY OF THE INVENTION

This invention resides in a combustible briquet comprising, in general, a central mass and at least one easily ignited thin member extending outwardly from the mass such that upon igniting the thin member, propagation of an ignited region proceeds rapidly to the mass. The invention further resides, broadly, in a holding member for a combustible briquet having a discernible surface with at least one configuration incised in the surface and providing a holding force sufficient to retain the briquet in a predetermined location relative to the surface.

The present invention further resides in a method of igniting one or more combustible briquets retained in the holding member of the present invention.

The combustible briquet of the present invention is readily ignitable such that propagation of an ignited region proceeds rapidly to the central mass and, thus, provides the heat necessary for cooking. The briquet has a plurality of easily ignited, thin, tapered members which enable easy and rapid ignition. In one embodiment, the briquet has a plurality of easily ignited, thin, tapered members meeting at an apex, which provides for simultaneous ignition of a plurality of the thin members. The thinness of the members provides for rapid ignition and propagation of an ignited region when one or more members are ignited. The briquet can be easily ignited with a match, whereas conventional briquets require a fire of some minutes duration, typically made from paper, wood or flammable fluid. Further, unlike the conventional charcoal briquet, the briquet of the present invention can be easily handled by the user without leaving a sooty residue.

The present invention also provides a readily ignitable, inexpensive combustible briquet holding means for igniting an array of briquets. The briquet holding means of the current invention in its elementary form is a single sheet of inexpensive cardboard, with incised configurations in its surface through which briquets can be inserted and held in a predetermined array. The briquet holding means retains the briquets in a configuration which can be stacked for transport or in a grill and provides ease of handling for the user.

The above and other features of the invention including various novel details of construction and combinations of parts will now be more particularly described with reference to the accompanying drawings and pointed out in the claims. It will be understood that the particular combustible briquet and ignition means embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIG. 2 is a matrix of briquets arrayed or retained in a planar holding member with several incised configurations illustrated without briquets.

FIG. 3 is a matrix of briquets arrayed and retained in a curved holding member with several incised configurations illustrated without briquets.

DETAILED DESCRIPTION OF THE INVENTION

Figure 1:
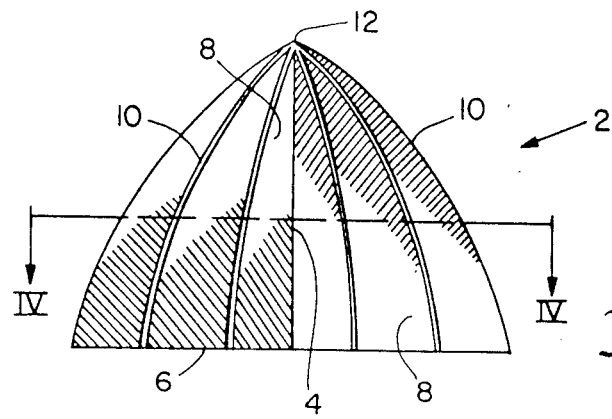
FIG. 1 is combustible briquet embodying features of the present invention.
Figure 4:
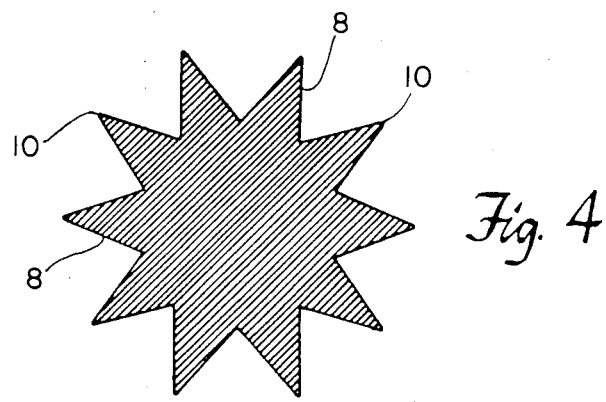
FIG. 4 is a cross-sectional view of the briquet of FIG. 1, along the line IV—IV.

Referring to FIG. 1, a combustible briquet 2 will be seen which has been made by extruding a liquid mass of ground charcoal which is subsequently allowed to dry. FIG. 1 comprises a substantially conical central mass 4, having a base 6, and a plurality of easily ignited, thin, tapered, members 8 extending outwardly from the mass 4. The members 8 provide an increased surface area on the briquet and the thinness of the members provides for rapid ignition and propagation of an ignited region when one or more members are ignited. The cross section of each member is substantially triangular as seen in FIG. 4 and tapers to an edge 10. The edges of the members meet at an apex 12, whereupon when the apex is ignited, propagation of an ignited region proceeds rapidly along most, if not all of the tapered edges.

Figure 1C:
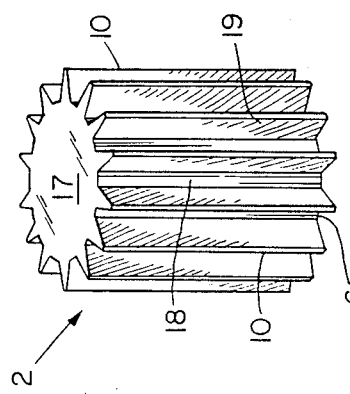
FIG. 1C is a briquet having a plurality of easily ignited, thin, tapered, linear, parallel members extending outwardly from a central mass.
Figure 1B:
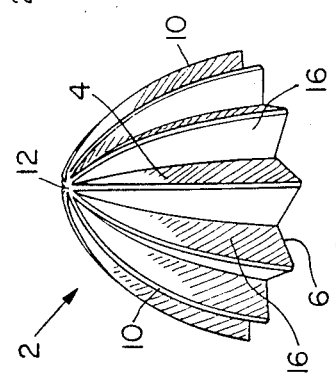
FIG. 1B is a briquet having a plurality of easily ignited, thin, tapered, curvilinear members extending outwardly from a central mass and meeting at an apex.
Figure 1A:
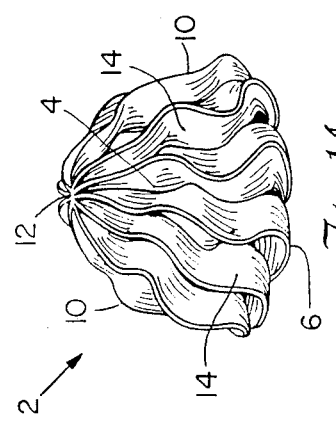
FIG. 1A is a briquet having a plurality of easily ignited, thin, tapered, serpentine, curvilinear members extending outwardly from a central mass and meeting at an apex.

Referring to FIG. 1A, a combustible briquet 2 will be seen which comprises a substantially conical central mass 4, having a base 6 and a plurality of easily ignited, thin, tapered, serpentine, curvilinear members 14 extending outwardly from the central mass. The serpentine configuration is obtained in the extrusion process.

Referring to FIG. 1B, a combustible briquet 2 will be seen which comprises a substantially conical central mass 4, having a base 6 and a plurality of easily ignited, thin, tapered, curvilinear members 16 extending outwardly from the central mass.

Referring to FIG. 1C, a combustible briquet 2 will be seen which comprises a substantially cylindrical central mass 18, having a base 6, and a plurality of easily ignited, thin, tapered, linear parallel members 19 extending outwardly from the central mass. The members do not meet at an apex as described in FIGS. 1A and 1B above, but terminate in a plateau 17.

The combustible briquet of the present invention can be comprised of various substances which are readily ignitable. For example, in one embodiment, the combustible briquet is comprised substantially of charcoal. However, other ignitable substances such as sawdust and wood pulp may also be used. Preferred materials burn with little flame or smoke, such as coal, coke and lignite. Other ingredients can be added to the ignitable substances, such as moderators (e.g., limestone), oxidizing agents to promote burning (e.g., nitrates), and binders to hold the briquet in a particular shape (e.g., starch). The term charcoal as used herein to describe the composition of the briquet of the present invention is defined as the material, principally carbon, produced by charring wood or other organic matter by a process of smothered combustion or heating in the absence of air.

The central mass 4 and 18 of the combustible briquet described above can be various shapes (e.g., spherical, cubical, cylindrical, pyramidal, conical) which provide sufficient surface area such that the thin members can be formed thereon. For example, in the embodiments of FIGS. 1A and 1B, the central mass is substantially conical, whereas in FIG. 1C the central mass is cylindrical. Further, the easily ignited, thin members 8, 14, 16 and 19 can be various shapes (e.g., linear, curvilinear, serpentine, spiral) which provide an edge and result in an increased surface area for rapid ignition and propagation of an ignited region. For example, in FIGS. 1A–1C above, the easily ignited, thin members are either serpentine curvilinear, FIG. 1A, or substantially curvilinear, FIG. 1B, or substantially linear as in FIG. 1C. An ignited region as defined herein is that portion (e.g., thin member, edge, apex) of the combustible briquet ignited by a flame which has sufficient heat to propagate to the central mass. As an aid to ignition, each briquet or groups of several briquets can be wrapped in paper or similar flammable material.

It has been found desirable to make the briquets of charcoal or other combustible material in fine powder form. This results in very thin edges 10 on the tapered members 8, 14, 16 and 19 and sharp pointed apices 12. The combustible powdered material in sizes from about 48 mesh and finer have been found desirable.

Figure 2C:
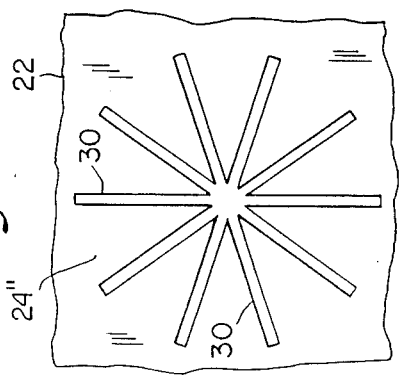
FIG. 2C is an incision configuration comprising triangular fingers defined by linear incisions.
Figure 2B:
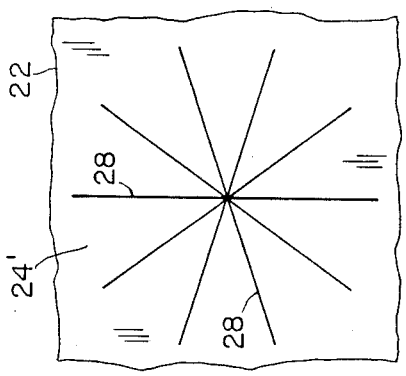
FIG. 2B is an incision configuration comprising inwardly extending radial fingers defined by linear incisions.
Figure 2A:
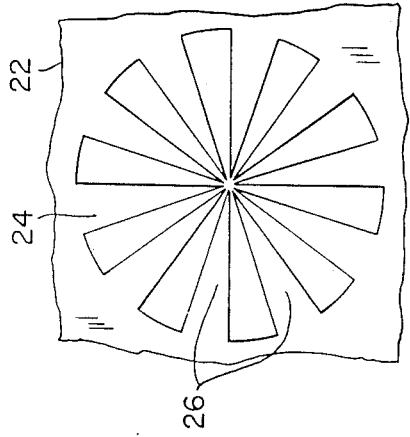
FIG. 2A is an incision configuration comprising triangular fingers spaced from one another.

Referring to FIG. 2, the present invention also resides in a holding member 20 for a combustible briquet 2 which comprises a discernible, generally planar, surface 22 having at least one configuration 24 incised in the surface. As also seen in FIG. 2A, the incised configuration comprises inwardly extending triangular fingers 26 spaced from one another. The incised configuration 24 provides a holding force necessary to retain the briquet 2 in a predetermined location relative to the surface 22. The inwardly extending triangular fingers 26 substantially complement the easily ignited, thin, tapered members 8 and 16 of the briquets of FIGS. 1 and 1B, respectively. These triangular fingers 26 spaced apart can be in an alternating up and down configuration to provide additional holding force.

Referring to FIG. 2B, at least one configuration 24' is incised in the surface 22 comprising inwardly extending radial fingers defined by linear incisions 28. The incised configuration 24' provides a holding force necessary to retain the briquet 2 in a predetermined location relative to the surface 22.

In FIG. 2C, the configuration 24" is incised in the surface comprising inwardly extending triangular fingers defined by linear incisions 30. The incised configuration 24" provides a holding force necessary to retain the briquet 2 in a predetermined location relative to the surface 22. The inwardly extending triangular fingers defined by linear incisions 30 substantially complement the easily ignited, thin, tapered members 8 and 16 of the briquets of FIGS. 1 and 1B, respectively.

One embodiment of the present invention will be seen in FIG. 2. It comprises a matrix 40 of combustible briquets and a holding member 20 having a discernible planar surface 22 and a plurality of incisions 24 made up of inwardly extending radial fingers 26. Each of the incisions is positioned to retain a briquet 2 in a predetermined location relative to the surface 22 and to the other briquets 2. The incisions are arranged in an array such that upon igniting the holding member 20, propagation of a spreading flame will proceed to ignite the plurality of briquets 2. The incisions can be arranged randomly, or preferably in a geometrically repeating array, such as a square grid, or closer packed, such as a hexagonal (i.e., staggered) array to provide a complemental arrangement when one or more holding members retaining briquets are stacked for packaging and transportation or arranging in a grill. Further, there is a stacking advantage to separating the briquet positions far enough apart from each other in a repeating array such that the bases of the briquets in one layer rest on the uncut portions of the holder underneath.

A configuration for arranging the briquets for maximum density begins with the square grid array mentioned above. It is formed of straight parallel rows of briquets in straight parallel columns. The briquets in every other row are then offset or staggered by moving all of the briquets in the row in one direction half the distance between the center of the briquet in the adjacent rows. The same is done with each column. Thus the centers of the briquets are arrayed as close as possible to one another.

Figure 5:
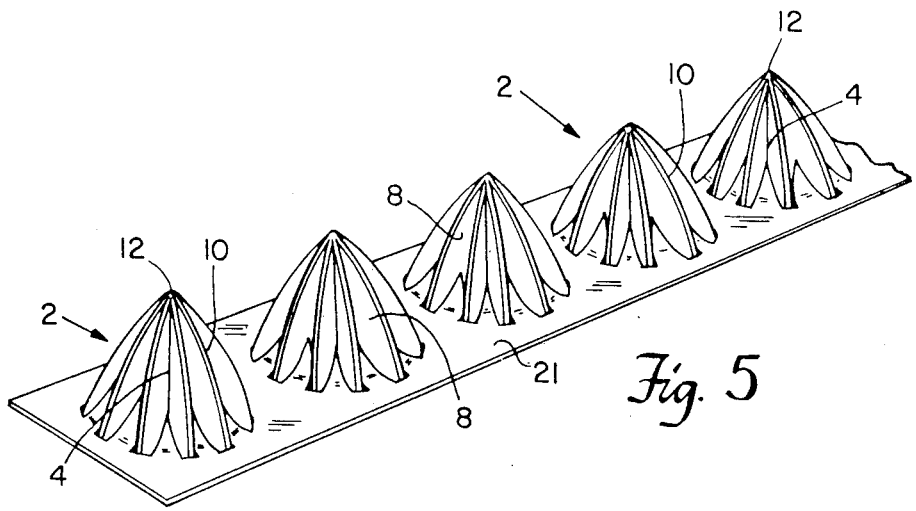
FIG. 5 is a continuous line of briquets retained in a holding member which is a strip.

In another configuration, seen in FIG. 5, the holding member is a strip or ribbon 21 containing the incisions at intervals along its length in a continuous line and retaining briquets 2. The strip of briquets may be a coil of substantial length whereby the user can tear off a length containing the desired number of briquets. Individual strips also may be randomly arranged or laid parallel within a package or bag for dispensing convenience.

The holding member 20 can be made of various combustible materials (e.g., cardboard, corrugated cardboard, paper, wood veneer) which can optionally contain an agent which aids in combustion (e.g., wax). Two or more holding members on top of one another can be used to increase the stiffness of the matrix, particularly if they have space between them. The incisions 24 can be slits or cut-outs varying in width in a configuration that preferably, but not necessarily, matches or complements that of the briquet (e.g., thin, tapered members). For example, for a briquet that has ten thin members arranged in a star or pinwheel meeting at an apex (FIG. 1B), the incisions in the holding member are similarly shaped (FIG. 2A). Alternatively, the incisions 24 could be circular holes in the holding member. The incisions are such that a briquet can be forced through the holding member and retained by the holding member in a predetermined location. The surface area of the holding member can be large enough to retain an assembly of briquets arranged in a row or matrix.

Referring to FIG. 3, the present invention further resides in a matrix 40 of combustible briquets which comprises a holding member 20 for the briquets 2 having a discernible curved surface 22' having a plurality of incisions 24, each of which is positioned to retain a briquet 2 in a predetermined location relative to the surface 22' and to the other briquets 2. In both the FIG. 2 and FIG. 3 embodiments, the incisions 24 are arranged in an array such that upon igniting the holding member 20, propagation of a spreading flame will proceed to ignite the plurality of briquets 2. Each briquet 2 is located in an incision 24 and comprises a central mass 4, having a base 6, and a plurality of easily ignited, thin, tapered members 8 extending outwardly from the central mass 4. The cross section of each member is substantially triangular and tapers to an edge 10. The edges 10 of the members meet at an apex 12, whereupon when the apex 12 is ignited, propagation of an ignited region proceeds rapidly along the tapered edges 10.

The present invention also resides in a method for igniting one or more combustible briquets 2. The method comprises providing a holding member 20 having a discernible surface 22 and at least one configuration incised in the surface 24 for retaining the briquet 2 in a predetermined location relative to the surface 24. The method further comprises placing the briquet 2 in the incised configuration 24 of the holding member 20 and igniting the holding member 20 such that propagation of a spreading flame will proceed to ignite the briquet 2.

Further, the present invention resides in a method of forming a combustible briquet. The method comprises providing a combustible composition (e.g., raw, dry charcoal) in the form of a fine powder and wetting the powder such that a paste is formed. Subsequently, the paste is extruded through an extrusion orifice to form a central mass and at least one easily ignited, thin member extending outwardly from the mass such that upon igniting the thin member, propagation of an ignited region proceeds rapidly to the mass.

The briquet of the present invention can also be formed, where design permits, by conventional briquetting methods wherein the paste is molded typically between two structures having indented surfaces.

I claim:

1. A combustible briquet comprising a central mass and a plurality of easily ignited, thin, tapered members extending outwardly from the mass, the cross section of each member being substantially triangular and tapering to an edge, the edges of the members meeting at an apex, whereupon when the apex is ignited, propagation of an ignited region proceeds rapidly along the tapered edges.

2. A combustible briquet according to claim 1 wherein the central mass is substantially conical.

3. A combustible briquet according to claim 1 wherein the tapered edge is substantially curvilinear.

4. A combustible briquet according to claim 1 wherein the tapered edge is substantially linear.

5. A combustible briquet according to claim 1 wherein the tapered edge is substantially serpentine curvilinear.

6. A combustible briquet according to claim 1 which is comprised substantially of charcoal.

7. A combustible briquet according to claim 1 comprising a finely powdered combustible material of about 48 mesh and finer in size.

8. A holding member for combustible briquets having a discernible surface,
   a plurality of incisions,
   each of the incisions being positioned to retain a briquet in a predetermined location relative to the surface and to the other briquets,
   the incisions being arranged in an array such that upon igniting the holding member propagation of a spreading flame will proceed to ignite the plurality of briquets.

9. A holding member for combustible briquets according to claim 8 wherein the array is staggered.

10. A holding member for combustible briquets according to claim 8 wherein each of the incisions comprises inwardly extending radial fingers.

11. A holding member for combustible briquets according to claim 8 wherein the surface is substantially planar.

12. A holding member for combustible briquets according to claim 8 wherein the surface is substantially curved.

13. A holding member for combustible briquets according to claim 8 wherein the holding member is a strip and the incisions are arranged in a continuous line.

14. A combustible briquet comprising:
   a substantially conical central mass and a plurality of easily ignited, thin, tapered members extending outwardly from the mass;

the cross section of each member being substantially triangular and tapering to an edge;

the edges of the members meeting at an apex, whereupon when the apex is ignited, propagation of an ignited region proceeds rapidly along the tapered edges.

15. A combustible briquet according to claim 14 which is comprised substantially of charcoal.

16. A combustible briquet according to claim 14 comprising a finely powdered combustible material of about 48 mesh and finer in size.

17. A holding member for combustible briquets having a discernible surface, a plurality of incisions comprising inwardly extending radial fingers, each of the incisions being positioned to retain a briquet in a predetermined location relative to the surface and to the other briquets, the incisions being arranged in a staggered array such that upon igniting the holding member propagation of a spreading flame will proceed to ignite the plurality of briquets.

18. A matrix of combustible briquets comprising:

a holding member for briquets having a discernible surface, a plurality of incisions, each of which is positioned to retain a briquet in a predetermined location relative to the surface and to the other briquets, the incisions being arranged in an array such that upon igniting the holding member propagation of a spreading flame will proceed to ignite the plurality of briquets, each briquet being located in an incision and comprising a central mass and a plurality of easily ignited, thin, tapered members extending outwardly from the mass, the cross section of each member being substantially triangular and tapering to an edge, the edges of the members meeting at an apex, whereupon when the apex is ignited, propagation of an ignited region proceeds rapidly along the tapered edges.

19. A matrix according to claim 18 wherein the central mass of the combustible briquets is substantially conical.

20. A matrix according to claim 18 wherein the tapered edge of the combustible briquets is substantially curvilinear.

21. A matrix according to claim 18 wherein the tapered edge of the combustible briquets is substantially linear.

22. A matrix according to claim 18 wherein the tapered edge of the combustible briquets is substantially serpentine curvilinear.

23. A matrix according to claim 18 wherein the combustible briquets are comprised substantially of charcoal.

24. A matrix according to claim 18 wherein the combustible briquets comprise a finely powered combustible material of about 48 mesh and finer in size.

25. A matrix according to claim 18 wherein the array of the holding member is staggered.

26. A matrix according to claim 18 wherein each of the incisions of the holding member comprises inwardly extending radial fingers.

27. A matrix according to claim 18 wherein the surface of the holding member is substantially planar.

28. A matrix according to claim 18 wherein the surface of the holding member is substantially curved.

29. A matrix according to claim 18 wherein the holding member is a strip and incisions are arranged in a continuous line.

* * * * *